United States Patent [19]
Gold et al.

[11] Patent Number: 5,553,817
[45] Date of Patent: Sep. 10, 1996

[54] TURN COORDINATION INHIBIT FOR ROTARY WING AIRCRAFT CONTROL SYSTEM

[75] Inventors: Phillip J. Gold, Shelton; Donald L. Fogler, Jr., Milford; Joseph Skonieczny, Madison, all of Conn.; James F. Keller, Media, Pa.

[73] Assignee: United Technologies Corporation, Hartford, Conn.

[21] Appl. No.: 237,540

[22] Filed: May 3, 1994

[51] Int. Cl.⁶ .................................................. B64C 13/16
[52] U.S. Cl. ......................................... 244/195; 244/17.13
[58] Field of Search ................................. 244/17.13, 194, 244/195, 181, 184, 196, 197, 178; 364/423, 424.01, 434, 435; 416/30, 32

[56] References Cited

U.S. PATENT DOCUMENTS

| | | | |
|---|---|---|---|
| 4,067,517 | 1/1978 | Barnum | 244/17.13 |
| 4,206,891 | 6/1980 | Perez et al. | 244/17.13 |
| 4,371,939 | 2/1983 | Adams et al. | 244/17.13 |
| 5,141,177 | 8/1992 | Wright et al. | 244/17.13 |
| 5,195,700 | 3/1993 | Fogler, Jr. et al. | 244/17.21 |
| 5,213,283 | 5/1993 | Gold et al. | 244/181 |
| 5,222,691 | 6/1993 | Gold et al. | 244/17.013 |
| 5,238,203 | 8/1993 | Skonieczny et al. | 244/17.13 |
| 5,263,662 | 11/1993 | Fowler et al. | 244/17.13 |

FOREIGN PATENT DOCUMENTS 9305458  3/1993  WIPO.

*Primary Examiner*—Galen L. Barefoot
*Attorney, Agent, or Firm*—Michael Grillo

[57] ABSTRACT

A turn coordination inhibit system (150) inhibits a rotary winged aircraft control system from operating in an automatic turn coordination mode when a pilot desired to perform a sideslip maneuver, e.g., a flat turn. When automatic turn coordination is not engaged (132,212,215), e.g., the aircraft is not in a coordinated turn, and either aircraft bank angle (119) exceeds an inhibit threshold magnitude (210) or a pilot yaw command provided by a pilot sidearm controller (155) exceeds a minimum threshold value (243), e.g., the sidearm controller is out of detent in the yaw axis, automatic turn coordination is inhibited (152). Automatic turn coordination remains inhibited until both aircraft bank angle falls below a reset threshold magnitude (230) and the sidearm controller is back in the detent position for the yaw axis (243).

19 Claims, 3 Drawing Sheets

TURN COORDINATION INHIBIT FOR ROTARY WING AIRCRAFT CONTROL SYSTEM

The Government has rights in this invention pursuant to Contract No. DAAJ09-91-C-A004 awarded by the Department of the Army.

TECHNICAL FIELD

The present invention relates to flight control systems for rotary wing aircraft, and more particularly to a turn coordination inhibit system for inhibiting automatic turn coordination control provided by a rotary wing aircraft model following control system.

BACKGROUND OF THE INVENTION

A coordinated turn for a rotary wing aircraft, e.g., a helicopter, is defined as a banked turn where the body of the aircraft is tangential to a curvilinear flight path and net acceleration is normal to the floor of the aircraft (no side-slip vectors).

In mechanical linkage control systems, a coordinated turn required that the pilot simultaneous input (via rudder pedals) the proper amount of yaw to match the amount of roll input provided via the cyclic stick. The more recent fly-by-wire flight control systems (see, e.g., U.S. Pat. Nos. 4,203,532, 4,067,517, 4,206,891 and 4,484,283, all assigned to the assignee of the present invention) automatically provide the matching yaw input. An automatic flight control system (AFCS) commands a coordinated yaw input, typically at air speeds above 60 knots, based on sensed lateral acceleration. The coordinating yaw signal is then used to modify the main rotor and tail rotor command signals as necessary to drive the helicopters lateral acceleration to zero.

U.S. Pat. Nos. 5,213,283, 5,222,691 and 5,238,303, all assigned to the assignee of the present invention, disclose a model following control system for a rotary wing aircraft which provides automatic turn coordination control. In the model following control system disclosed in the above identified patents, automatic turn coordination control is provided in response to a pilot sidearm controller roll input provided that the aircraft bank angle, roll rate and airspeed exceed minimum threshold values. Thereafter, automatic turn coordination is terminated when both bank angle and roll rate are below threshold values.

Under certain flight conditions, automatic turn coordination may not be desirable. This is true in situations where the pilot desires to perform a flat turn which is accomplished by yawing without any roll command, e.g., the pilot is commanding a side slip maneuver. When performing such a side slip maneuver, an inadvertent roll command may automatically place the aircraft into a coordinated turn. An example of a maneuver where a coordinated turn isn't desired is a snap turn. When performing a snap turn, the pilot inputs a yaw command without a corresponding roll command. In response, the aircraft yaws, for example, to aim at a target. Another example of when a pilot would want to inhibit turn coordination is during a take off where there are terrain restrictions so that the pilot takes off laterally then inputs a yaw kick. As the aircraft begins to move laterally from take off, the forward airspeed is approximately zero knots but the bank angle may be above the threshold for automatic turn coordination. When the pilot inputs a yaw command, the aircraft may suddenly meet the 60 knot airspeed requirement and, therefore, turn coordination is automatically engaged and the aircraft will go into a coordinated turn.

One method used to overcome automatic turn coordination is to provide the pilot with a manual switch or button which must be depressed or repositioned to inhibit turn coordination. However, such a manual inhibit greatly increases pilot workload.

DISCLOSURE OF INVENTION

Objects of the invention include the provision of an improved model following control system for a rotary wing aircraft which inhibits automatic turn coordination when a flat turn, i.e., side slip maneuver, is commanded by the pilot so that inadvertent roll commands will not automatically place the aircraft into turn coordination.

According to the present invention, when automatic turn coordination is not engaged, e.g., the aircraft is not in a coordinated turn, and aircraft bank angle exceeds an inhibit threshold magnitude, automatic turn coordination is inhibited until aircraft bank angle falls below a reset threshold magnitude.

In further accord with the present invention, when automatic turn coordination is not engaged, if a pilot yaw command provided by a pilot sidearm controller exceeds a minimum threshold value, e.g., the sidearm controller is out of detent in the yaw axis, automatic turn coordination is inhibited until the yaw command falls below the minimum threshold magnitude, e.g., the sidearm controller is back in the detent position for the yaw axis.

The present invention provides a significant improvement over the prior art because it allows the pilot to perform sideslip maneuvers without activating automatic turn coordination in response to an inadvertent roll input. Pilot workload is reduced because the pilot is not required to take any action to disable automatic turn coordination, but rather automatic turn coordination is inhibited during such maneuvers.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

The turn coordination inhibit system of the present invention is particularly well suited for inhibiting automatic turn coordination when a pilot desires to perform a sideslip maneuver without engagement of automatic turn coordination. Therefore, the pilot may perform a flat turn, and the inhibit system will prevent an inadvertent roll command from activating automatic turn coordination.

Figure 1:
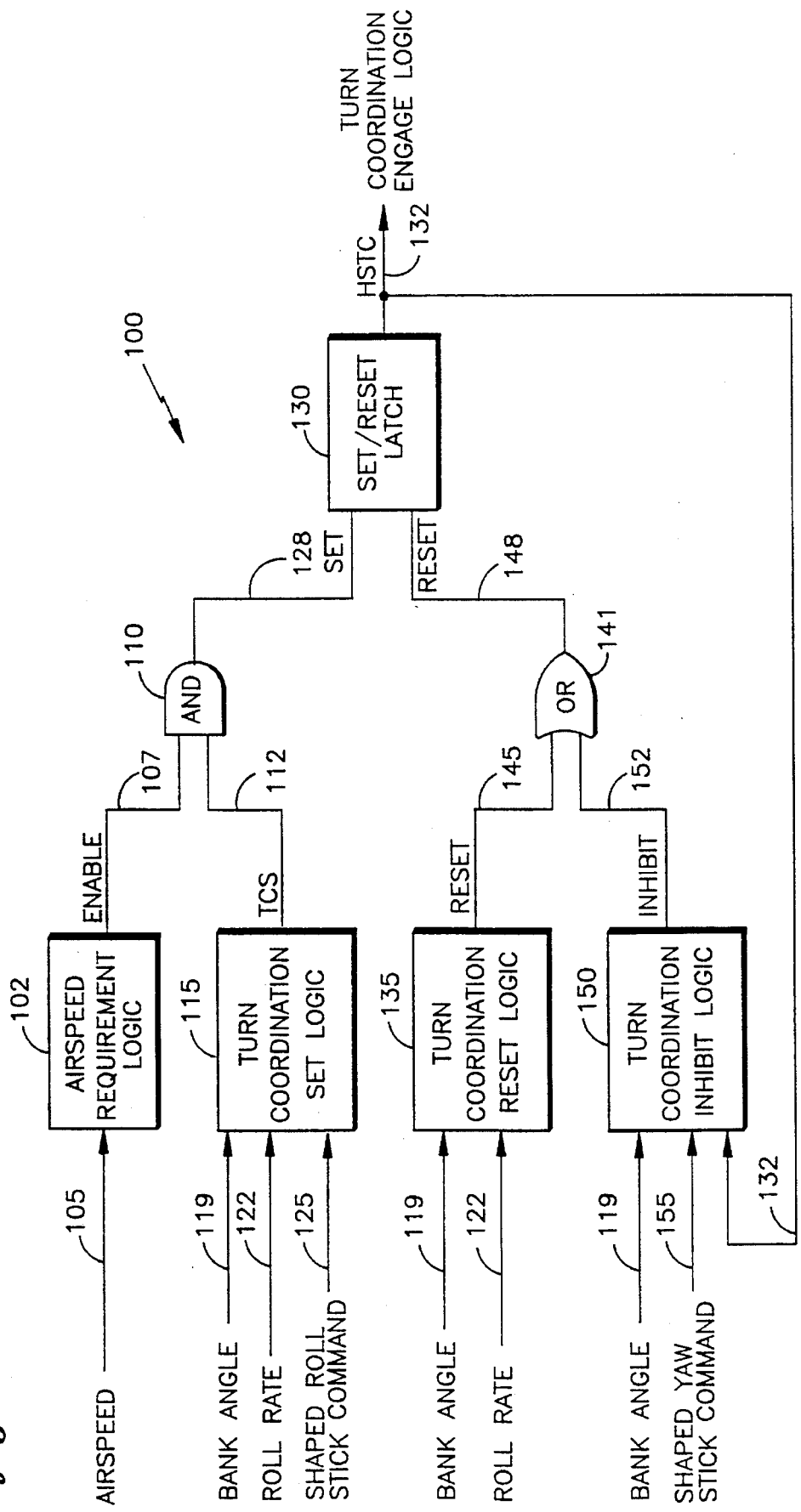
FIG. 1 is a schematic block diagram of automatic turn coordination control logic having turn coordination inhibit logic in accordance with the present invention.

Referring to FIG. 1, the Automatic Turn Coordination Control Logic 100 is shown. Several conditions must be met before automatic turn coordination control is set or activated. Airspeed Requirement Logic 102 is responsive to an airspeed signal on a line 105 for providing an ENABLE signal on a line 107 to an AND gate 110. The airspeed signal on the line 105 may be provided by an airspeed sensor located on the aircraft, or other suitable means of sensing aircraft airspeed. The Airspeed Requirement Logic 102 implements a hysteresis function which provides the ENABLE signal on the line 107 when airspeed is above an enable threshold magnitude, e.g., 60 knots, and which clears or removes the ENABLE signal from the line 107 when airspeed falls below a minimum threshold magnitude, e.g., 55 knots. Although specific values are often times recited in the specification herein above and herein after, these values are used by way of example to facilitate an understanding of the invention, and not by way of limitation on the invention. As may be understood by those skilled in the art, the actual values will depend on the requirements of each aircraft.

The other input to the AND gate 110 is a turn coordination set (TCS) signal on a line 112 provided by Turn Coordination Set Logic 115. The Turn Coordination Set Logic 115 is responsive to a bank angle signal provided on a line 119, a roll rate signal provided on a line 122, and a signal indicative of the roll stick command being input by a pilot via the side arm controller on a line 125. For purposed of describing the present invention, the sidearm controller is a four-axis force stick in which yaw axis command signals are generated by the pilot's lateral twisting (left or right) of the sidearm controller, pitch axis command signals are generated by the pilot's pushing and pulling (front or back) of the sidearm controller, roll axis command signals are generated by the pilot applying a left or right force to the sidearm controller, and collective commands are generated by the pilot applying an up or down force to the side arm controller. If the magnitude of the bank angle signal, roll rate signal, and shaped roll stick command signal are above respective threshold magnitudes, then the TCS signal is provided on the line 112 to AND gate 110. The output of the AND gate 110 is provided on a line 128 to the SET terminal of a turn coordination control latch 130. When the latch 130 is set, it provides a high speed turn coordination (HSTC) output signal on the line 132.

Turn Coordination Reset Logic 135 is responsive to the bank angle signal on the line 119 and the roll rate signal on the line 122 for provided a RESET signal to an OR gate 141 on a line 145. The Turn Coordination Reset Logic 135 provides the RESET signal when the magnitude of the bank angle 119 is less than a bank angle reset threshold magnitude, e.g., 3°, and the magnitude of the roll rate signal is below a roll rate reset threshold magnitude, e.g., 2°/sec. The output of the OR gate 141 is provided on a line 148 to the RESET terminal of the latch 130.

All of the apparatus described thus far is exemplary of that which is known in the art, as described for example in U.S. Pat. No. 5,238,203 entitled, High Speed Turn Coordination for Rotary Wing Aircraft, assigned to the assignee of the present invention.

In accordance with the present invention, Turn Coordination Inhibit Logic 150 provides an INHIBIT signal on a line 152 to the OR gate 141 under conditions where the pilot is performing a side slip maneuver indicating that automatic turn coordination is not desired. The INHIBIT signal is provided via the OR gate 141 and line 148 to the RESET terminal of the latch 130. It is important to the operation of the Turn Coordination Inhibit Logic 150 of the present invention that the set and reset latch 130 be of the type where reset has priority. Therefore, the Turn Coordination Inhibit Logic latches out turn coordination when the conditions for inhibit are met.

The Turn Coordination Inhibit Logic 150 is responsive to the bank angle signal on the line 119, a signal indicative of the yaw stick command being input by the pilot on the pilot sidearm controller on a line 155, and the HSTC signal on the line 132. If turn coordination is not engaged, e.g., the latch 130 is not set and HSTC is logic low, then if either the magnitude of the bank angle on the line 119 is greater than an inhibit threshold, or the pilot is inputting a yaw command above a threshold magnitude as indicated on a line 155, e.g., the pilot side arm controller is out of the detent position for the yaw axis, then the Turn Coordination Inhibit Logic provides the INHIBIT signal on a line 152. Once turn coordination inhibit has been activated, the INHIBIT signal is removed if the yaw stick is placed back in the detent position or the magnitude of the bank angle is less than a reset threshold magnitude, e.g., 3°.

Figure 2:
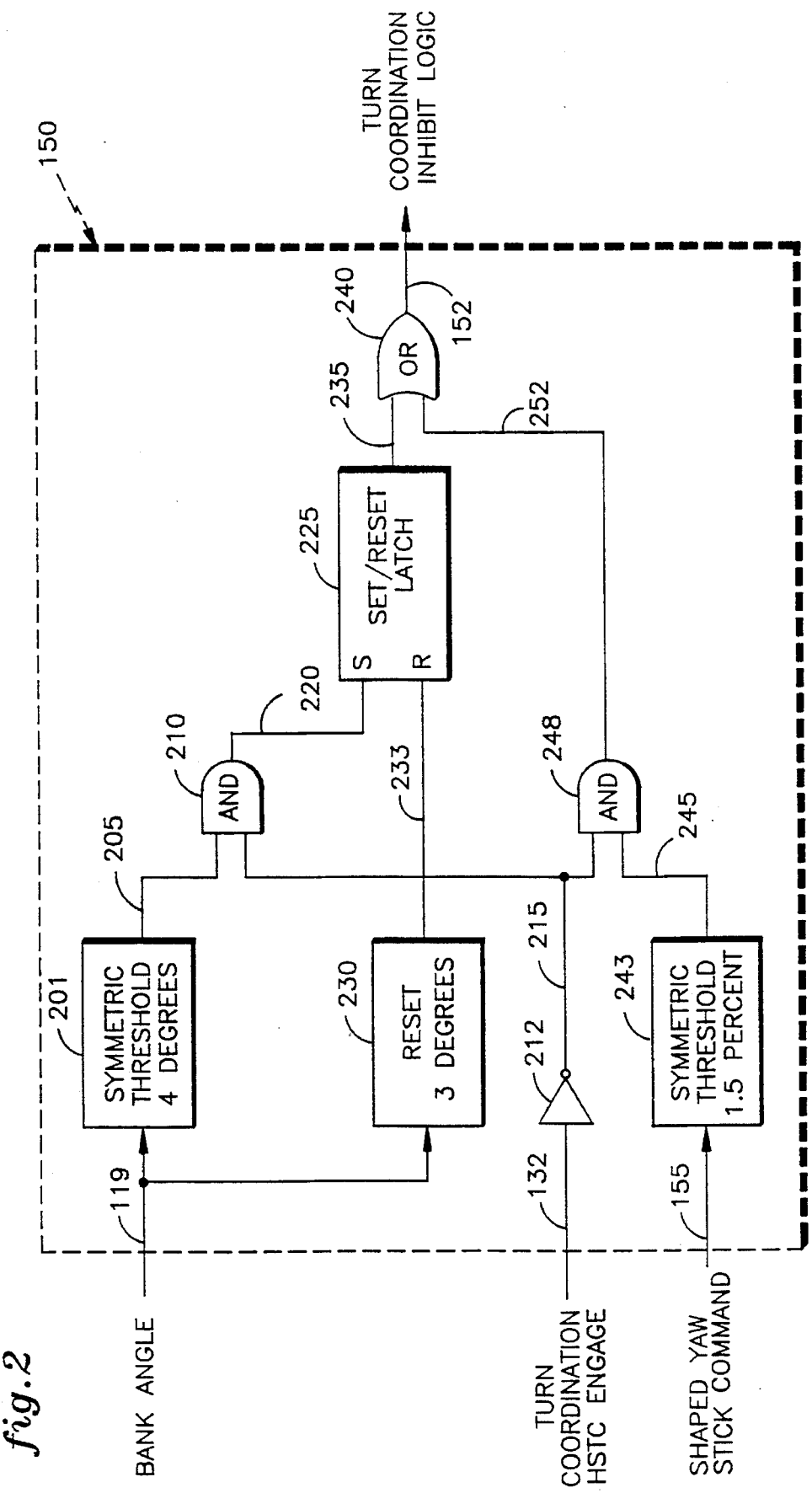
FIG. 2 is a schematic block diagram showing the turn coordination inhibit logic of FIG. 1 in more detail.

FIG. 2 shows the Turn Coordination Inhibit Logic 150 in greater detail. Referring to FIG. 2, the bank angle signal is provided on the line 119 to a Bank Angle Symmetric Threshold Function 201. If the magnitude of the bank angle signal is greater than an inhibit threshold magnitude, e.g. 4°, the Bank Angle Symmetric Threshold Function 201 provides a signal on a line 205 to an AND gate 210. The other input to the AND gate 210 is the output of a NOT gate 212 provided on a signal line 215. The input to the NOT gate 212 is the HSTC signal on the line 132. Therefore, if the latch 130 is set, HSTC is logic high on the line 132, and the output of the NOT gate 212 is a logic low on the line 215. Similarly, if the latch 130 is not set, then the output of the latch on the line 132 is a logic low, and the output of the NOT gate 212 is a logic high on the line 215. The output of the AND gate 210 is provided on a line 220 to the SET terminal of an inhibit latch 225. Therefore, the latch 225 will only be set if turn coordination is not engaged and the magnitude of the bank angle is greater than the inhibit threshold magnitude.

The bank angle signal on the line 119 is also provided to a Reset Function 230. The Reset Function 230 provides a signal on a line 233 to the RESET terminal of the latch 225 when the magnitude of the bank angle signal is less than a reset threshold magnitude, e.g., 3°. The output of the latch 225 is provided on a line 235 to an OR gate 240, the output of which is the INHIBIT signal on the line 152.

The pilot yaw input command is provided on the line 155 to a Yaw Command Symmetrical Threshold Function 243. If the magnitude of the yaw command on the line 155 is greater than an inhibit threshold magnitude, then the Yaw Command Symmetrical Threshold Function 243 provides an output on a line 245 to an AND gate 248. The other input to the AND gate 248 is the output of the NOT gate 212 on the line 215. The output of the AND gate 248 is provided on a line 252 to the OR gate 240. Therefore, if turn coordination is not engaged and the pilot inputs a yaw command above a threshold magnitude, turn coordination will be inhibited.

Figure 3:
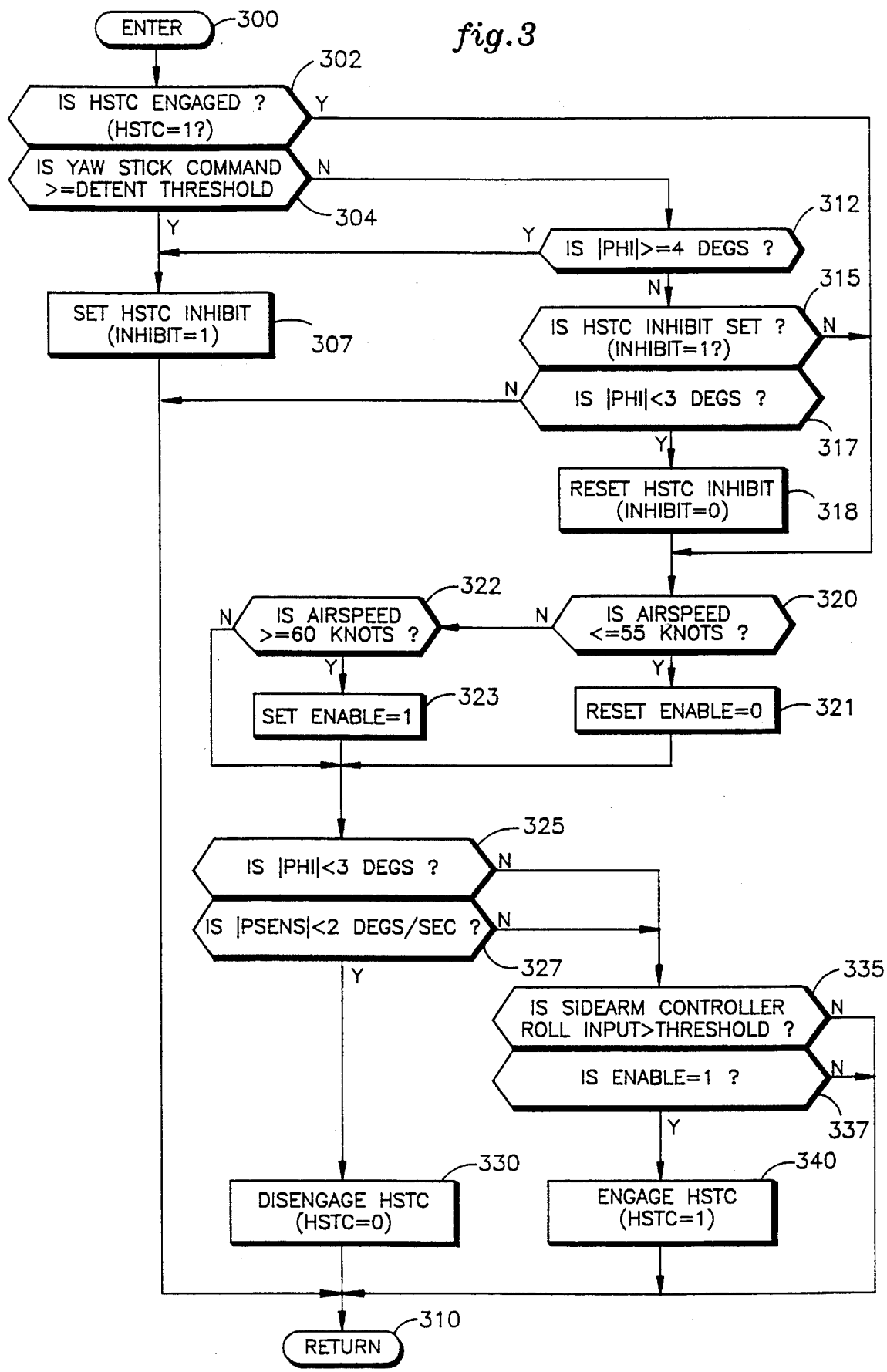
FIG. 3 is a logic flow diagram for implementing the turn coordination control logic of FIG. 1.

Although the Automatic Turn Coordination Control Logic of the present invention has been illustrated in terms of function blocks and digital logic gates in FIGS. 1 and 2, the invention may be implemented very easily with a simple computer program of the type illustrated in FIG. 3. Such routine may be performed digitally by means of a microprocessor (UPROC), or it may be incorporated as a simple program change within a digital, computerized automatic flight control system.

Referring to FIG. 3, the program is entered in a step 300, and the UPROC checks if automatic turn coordination is engaged, e.g., HSTC=1, in a step 302. If the results of the test 302 are negative, the UPROC checks in a test 304 if the pilot is inputting a yaw stick command via the sidearm controller greater than or equal to an inhibit threshold magnitude. If the results of the test 304 are positive, the conditions for turn coordination inhibit are met, and a step 307 is performed wherein turn coordination inhibit is set, e.g., INHIBIT=1. The subroutine then returns in a step 310. If the results of the test 304 are negative, the UPROC checks if the magnitude of the bank angle is greater than or equal to an inhibit threshold magnitude in a test 312. Again, if the results of the test 312 are positive, the conditions for turn coordination inhibit are met and the step 307 is performed wherein turn coordination inhibit is set. The subroutine then returns in the step 310. However, if the results of the test 312 are negative, the UPROC checks if turn coordination inhibit has been previously set an a test 315. If the results of the test 315 are positive, a test 317 is performed wherein the UPROC checks if the magnitude of the bank angle is less than a reset threshold magnitude. If the results of the test 317 are negative, then the conditioning for resetting turn coordination inhibit have not been met and the subroutine returns in the step 310. If the results of the test 317 are positive, the conditions for removing the turn coordination inhibit have been met and a step 318 is performed wherein the turn coordination inhibit is reset, e.g., INHIBIT=0.

If the results of the test 315 are negative, or if the turn coordination inhibit is reset in the step 318, the subroutine reaches a test 320 wherein the UPROC checks if airspeed is less than a minimum disable threshold magnitude, e.g. 55 knots. If the results of the test 320 are positive, a step 321 is performed wherein a turn coordination enable is reset, e.g., ENABLE=0. If the results of the test 320 are negative, the UPROC checks in a test 322 if airspeed is greater than or equal to an enable threshold magnitude, e.g., 60 knots. If the results of the test 322 are positive, a step 323 is performed wherein the high speed turn coordination enable is set, e.g., ENABLE=1. The steps and tests 320 through 321 implement a hysteresis function which enables high speed turn coordination when airspeed is above an enable threshold magnitude, e.g., 60 knots, and clears the enable when airspeed falls below a reset threshold magnitude, e.g. 55 knots.

If the results of the test 322 are negative, or after the performance of the step 321 or 323, a test 325 is reached wherein the UPROC checks if the magnitude of the bank angle is less than a bank angle reset threshold magnitude. If the results of the test 325 are positive, a test 327 is performed wherein the UPROC checks if the magnitude of the roll rate is less than a roll rate threshold magnitude. If the results of the test 327 are positive, a step 330 is performed wherein turn coordination is disengaged, e.g., HSTC=0. The subroutine then exits in the step 310.

If the results of either of the test 325 or 327 are negative, a step 335 is performed wherein the UPROC checks if the pilot is inputting a roll input above a threshold magnitude. If the results of the test 335 are positive a test 337 is performed wherein the UPROC checks if the airspeed enable was set in step 323. If the results of the test 337 are positive, the conditions for the engagement of automatic turn coordination have been met, and turn coordination is engaged in a step 340, e.g., HSTC=1. The subroutine then returns in the step 310. If the results of either of the tests 335 or 337 are negative, then the subroutine exits in the step 310.

It should be noted in the logic illustrated in FIG. 3, that airspeed is only used as a criteria, e.g., enable, for enabling the Automatic Turn Coordination Control Logic. The two criteria for disengaging the Automatic Turn Coordination Control Logic are bank angle and roll rate. If the magnitude of both bank angle and roll rate fall below their respective predetermined minimum, and the aircraft is coordinated, then automatic turn coordination control is disengaged. This logic allows automatic turn coordination control to remain engaged throughout a deceleration turn in which airspeed drops below 60 knots, but either roll rate or bank angle remain above the respective predetermined minimum threshold magnitudes.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

We claim:

1. A turn coordination inhibit system for inhibiting a helicopter control system from providing turn coordination, the inhibit system comprising:

turn coordination indicating means for providing a turn coordination signal when the control system is operating in a turn coordination mode;

bank angle indicating means for providing a bank angle signal indicative of helicopter bank angle; and signal processing means responsive to the absence of said turn coordination signal and the magnitude of said bank angle signal exceeding an inhibit threshold magnitude for inhibiting the control system from operating in said turn coordination mode.

2. A turn coordination inhibit system according to claim 1 further comprising:

pilot operated yaw command means for changing the attitude of the helicopter about its yaw axis;

yaw command means for providing a yaw command signal indicative of the magnitude of said yaw command being commanded by said pilot operated yaw command means; and said signal processing means being responsive to the absence of said turn coordination signal and the magnitude of said yaw command signal exceeding a minimum threshold magnitude for inhibiting the control system from operating in said turn coordination mode.

3. A turn coordination inhibit system according to claim 1 wherein during inhibit of the control system from operating in said turn coordination mode, said signal processing means is responsive to the magnitude of said bank angle signal being less than a reset threshold magnitude for allowing the control system to operate in said turn coordination mode.

4. A turn coordination inhibit system according to claim 2 wherein during inhibit of the control system from operating in said turn coordination mode, said signal processing means is responsive to both the magnitude of said bank angle signal being less than a reset threshold magnitude and the magnitude of said yaw command signal being less than a yaw command reset threshold magnitude for allowing the control system to operate in said turn coordination mode.

5. A turn coordination inhibit system according to claim 2 wherein said yaw command means is a pilot operated sidearm controller, and wherein said minimum threshold magnitude corresponds to said sidearm controller being out of a detent position for yaw axis commands.

6. A turn coordination inhibit system according to claim 4 wherein said yaw command means is a pilot operated sidearm controller, and wherein said minimum threshold magnitude corresponds to said sidearm controller being out of a detent position for yaw axis commands.

7. A turn coordination inhibit system according to claim 6 wherein said yaw command reset threshold magnitude corresponds to said sidearm controller being in said detent position for said yaw axis.

8. A turn coordination inhibit system for inhibiting a helicopter control system from providing turn coordination, the inhibit system comprising:

turn coordination indicating means for providing a turn coordination signal when the control system is operating in a turn coordination mode;

pilot operated yaw command means for changing the attitude of the helicopter about its yaw axis;

yaw command means for providing a yaw command signal indicative of the magnitude of said yaw command being commanded by said pilot operated yaw command means; and signal processing means responsive to the absence of said turn coordination signal and the magnitude of said yaw command signal exceeding a minimum threshold magnitude for inhibiting the control system from operating in said turn coordination mode.

9. A turn coordination inhibit system according to claim 8 further comprising:

bank angle indicating means for providing a bank angle signal indicative of helicopter bank angle; and said signal processing means being responsive to the absence of said turn coordination signal and the magnitude of said bank angle signal exceeding an inhibit threshold magnitude for inhibiting the control system from operating in said turn coordination mode.

10. A turn coordination inhibit system according to claim 8 wherein during inhibit of the control system from operating in said turn coordination mode, said signal processing means is responsive to the magnitude of said yaw command signal being less than a yaw command reset threshold magnitude for allowing the control system to operate in said turn coordination mode.

11. A turn coordination inhibit system according to claim 9 wherein during inhibit of the control system from operating in said turn coordination mode, said signal processing means is responsive to both the magnitude of said bank angle signal being less than a reset threshold magnitude and the magnitude of said yaw command signal being less than a yaw command reset threshold magnitude for allowing the control system to operate in said turn coordination mode.

12. A turn coordination inhibit system according to claim 8 wherein said yaw command means is a pilot operated sidearm controller, and wherein said minimum threshold magnitude corresponds to said sidearm controller being out of a detent position for yaw axis commands.

13. A turn coordination inhibit system according to claim 11 wherein said yaw command means is a pilot operated sidearm controller, and wherein said minimum threshold magnitude corresponds to said sidearm controller being out of a detent position for yaw axis commands.

14. A turn coordination inhibit system according to claim 13 wherein said yaw command reset threshold magnitude corresponds to said sidearm controller being in said detent position for said yaw axis.

15. A turn coordination inhibit system for inhibiting a helicopter control system from providing automatic turn coordination, the inhibit system comprising:

automatic turn coordination indicating means for providing an automatic turn coordination signal when the control system is operating in an automatic turn coordination mode;

bank angle indicating means for providing a bank angle signal indicative of helicopter bank angle;

pilot operated yaw command means for changing the attitude of the helicopter about its yaw axis;

yaw command means for providing a yaw command signal indicative of the magnitude of said yaw command being commanded by said pilot operated yaw command means; and signal processing means responsive to the absence of said automatic turn coordination signal and either the magnitude of said bank angle signal exceeding an inhibit threshold magnitude or the magnitude of said yaw command signal exceeding a minimum threshold magnitude for providing an inhibit signal which inhibits the control system from operating in said automatic turn coordination mode.

16. A turn coordination inhibit system according to claim 15 wherein said signal processing means is responsive to the presence of said inhibit signal and both the magnitude of said bank angle signal being less than a reset threshold magnitude and the magnitude of said yaw command signal being less than a yaw command reset threshold magnitude for removing said inhibit signal, thereby allowing the control system to operate in said automatic turn coordination mode.

17. A turn coordination inhibit system according to claim 15 wherein said yaw command means is a pilot operated sidearm controller, and wherein said minimum threshold magnitude corresponds to said sidearm controller being out of a detent position for yaw axis commands.

18. A turn coordination inhibit system according to claim 16 wherein said yaw command means is a pilot operated sidearm controller, and wherein said minimum threshold magnitude corresponds to said sidearm controller being out of a detent position for yaw axis commands.

19. A turn coordination inhibit system according to claim 18 wherein said yaw command reset threshold magnitude corresponds to said sidearm controller being in said detent position for said yaw axis.

* * * * *